United States Patent [19]

Yamanouchi

[11] Patent Number: 4,656,544
[45] Date of Patent: Apr. 7, 1987

[54] LOADING DEVICE FOR DISC CASSETTES

[75] Inventor: Hiroshi Yamanouchi, Tokyo, Japan

[73] Assignee: Sony Corporation, Tokyo, Japan

[21] Appl. No.: 708,505

[22] Filed: Mar. 5, 1985

[30] Foreign Application Priority Data

Mar. 9, 1984 [JP] Japan ................................. 59-45879

[51] Int. Cl.⁴ ............................................. G11B 5/012
[52] U.S. Cl. ....................................... 360/97; 360/133
[58] Field of Search ................................. 360/97, 133

[56] References Cited

U.S. PATENT DOCUMENTS

4,368,495 1/1983 Hamanaka et al. ..................... 360/97
4,419,703 12/1983 Gruzelak et al. ...................... 360/97

Primary Examiner—A. Michael Chambers
Attorney, Agent, or Firm—Lewis H. Eslinger; Alvin Sinderbrand

[57] ABSTRACT

In a loading device for disc cassettes, an engaged portion or recess of the disc cassette is engaged with a coupling member of the loading device, when the disc cassette is manually inserted to a first position in a cassette holder. In response to further slight insertion of the cassette to a second position, the disc cassette is automatically drawn-in to a predetermined third position through the coupling member by a motor which is driven in response to a signal produced by a sensor, and thereafter, the cassette holder is lowered from a cassette inserting position to a cassette loading position, so that the disc cassette can be always safely moved to its loading position without being inclined.

4 Claims, 10 Drawing Figures

LOADING DEVICE FOR DISC CASSETTES

BACKGROUND OF THE INVENTION

1. Field of the Invention

This invention relates generally to a loading device for disc cassettes, wherein a disc cassette is inserted horizontally into a cassette holder in a cassette inserting position which is then lowered to a cassette loading position on a turntable while remaining substantially horizontal, and it is most suitable to apply this invention to the loading device for micro floppy disc cassettes.

2. Description of the Prior Art

In the conventional loading device for disc cassettes of this sort, the disc cassette is manually inserted into the cassette holder rather than being inserted automatically by a motor. Therefore, when inserted, the disc cassette is often inclined, and particularly in case of a two sided disc drive apparatus, is apt to come into heavy contact with an upper head and cause damage thereto. In the conventional loading device, it is necessary to provide room between the cassette holder and the disc cassette, and this room causes the disc cassette to be inclined easily. In addition, the upper head of the two sided disc drive apparatus is to be arranged near the top face of the cassette holder.

Further, in the case of the conventional loading device, the cassette holder is lowered from the cassette inserting position to the cassette loading position by the force of a spring. Therefore, when roughly inserted in the cassette holder, the disc cassette is lowered rapidly, so that the upper and lower heads, between which the disc is sandwiched, collide impulsively with each other and are apt to be damaged.

OBJECTS AND SUMMARY OF THE INVENTION

Accordingly, it is an object of the present invention to provide a loading device for disc cassettes in which a disc cassette is automatically drawn into a predetermined position in a cassette holder after being inserted manually to a certain extent in the cassette holder, and then lowered automatically, by operation of a motor, from a cassette inserting position to a cassette loading position at which the disc is engaged with a turntable.

More specially, it is an object of this invention to provide a loading device for disc cassettes in a two-sided disc drive, and in which a disc cassette is drawn automatically into a cassette holder so as to be always accurately inserted therein, and is prevented from being inclined while being inserted for avoiding heavy contact with, and consequent damage to an upper head of the disc drive.

A further object of the invention is to provide a loading device for disc cassettes in which a cassette holder can be lowered quietly and accurately with a constant speed by a motor from a cassette inserting position to a cassette loading position after a disc cassette is manually inserted in a predetermined position of the cassette holder, and is never lowered roughly and rapidly to the cassette loading position, so that upper and lower heads are prevented from colliding inpulsively with a disc therebetween and being thereby damaged.

Still another object of the invention is to provide a loading device for disc cassettes in which a disc cassette, which is usually ejected antomatically in response to to reverse rotation of a motor, can be automatically ejected at a time of electric failure or emergency by the forces of springs that are triggered through a hand-operated mechanism.

DETAILED DESCRIPTION OF A PREFERRED EMBODIMENT

A loading device for micro floppy disc cassettes embodying the present invention will be seen to include a raising and lowering mechanism for a cassette holder 1 which will be described with reference to FIGS. 1-4.

The cassette holder 1 is arranged horizontally between a pair of right and left support plates 3a an 3b which are disposed upright on a chassis 2. A connecting plate 4 extends horizontally over the cassette holder 1 between the pair of support plates 3a and 3b, and is mounted on the support plates 3a and 3b so as to pivot turn in up and down directions on first pivots 5a and 5b which are protrude from respective right and left end flanges 4a and 4b on connecting plate 4.

Figure 2A:
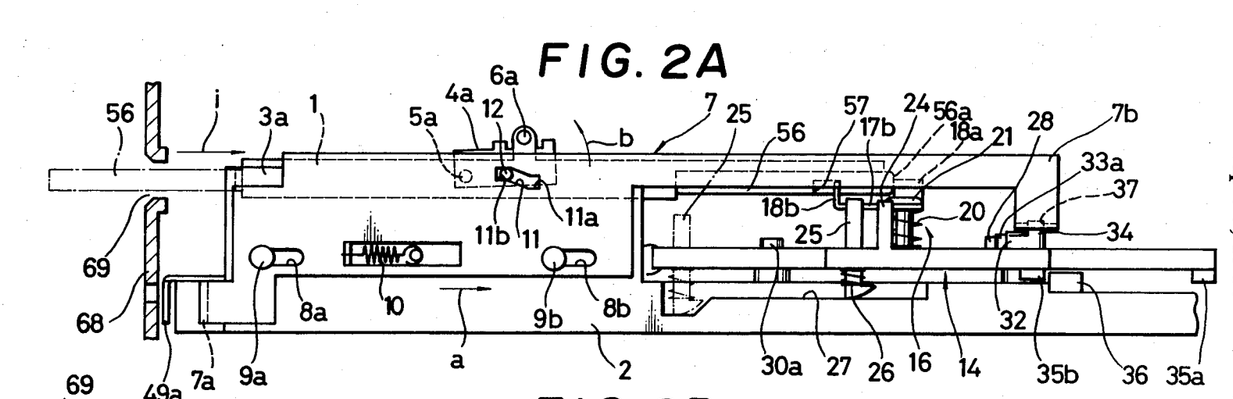
FIGS. 2A and 2B are enlarged side elevational views taken along the line II—II on FIG. 1.

The cassette holder 1 is pivotally suspended at a position that is almost centered in the direction of its longitudinal axis through second pivots 6a and 6b which are fitted in respective bearings provided in the right and left end flanges 4a and 4b of the connecting plate 4 as to be spaced upward from the first pivots 5a and 5b, as shown particularly on FIG. 2A.

An operating plate 7 for raising and lowering the cassette holder 1 is arranged along the outside of the support plate 3a, and guided by the co-action of a pair of elongated holes 8a and 8b in the operating plate 7 which are spaced in the longitudinal direction from each other, and a pair of guide pins 9a and 9b protruding from the support plate 3a and slidably fitted in the respective elongated holes 8a and 8b.

The operating plate 7 is urged slidably in the rear direction (in direction of arrow a on FIG. 2A) by a spring 10. An inclined guideway 11 which inclines downward in the rear direction, is provided in the operating plate 7. A pin 12 disposed on the end flange 4a of the connecting plate 4 is loosely fitted in this inclined guideway 11.

Figure 2B:
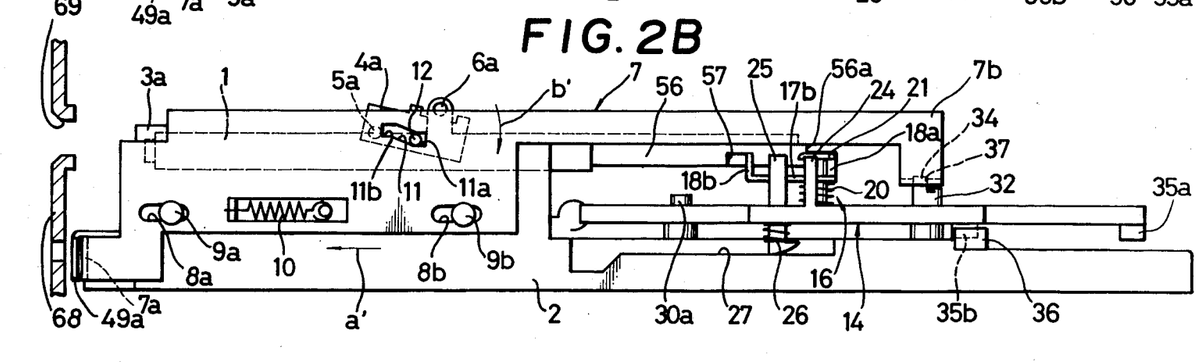

When the operating plate 7 is slid in the forward direction of arrow a' shown in FIG. 2B against force of the spring 10 by a mechanism for driving the operating plate 7 as described later, the pin 12 is guided by the inclined guideway 11 and moved to the horizontal lower end portion 11a of the inclined guideway 11. As a result, the connecting plate 4 is pivoted in direcion of arrow b' and the cassette holder 1 is lowered to its loading position.

On the contrary, when the operating plate 7 is slid in direction of arrow a as on FIG. 2A, the pin 12 is guided by the inclined guideway 11 and moved to the horizontal upper end portion 11b of the inclined guideway 11.

Then, the connecting plate 4 is pivoted in the direction of arrow b and the cassette is raised to its inserting position.

Figure 3A:
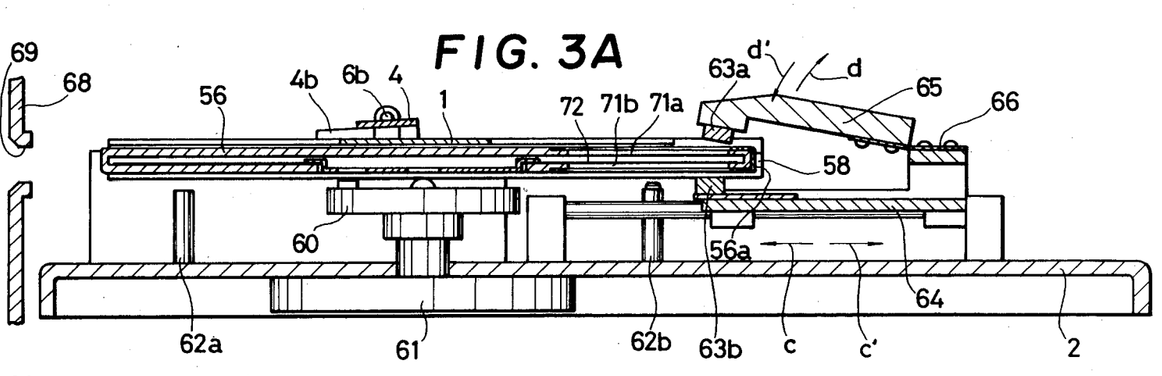
FIGS. 3A and 3B are enlarged sectional views taken along the line III—III on FIG. 1.
Figure 3B:
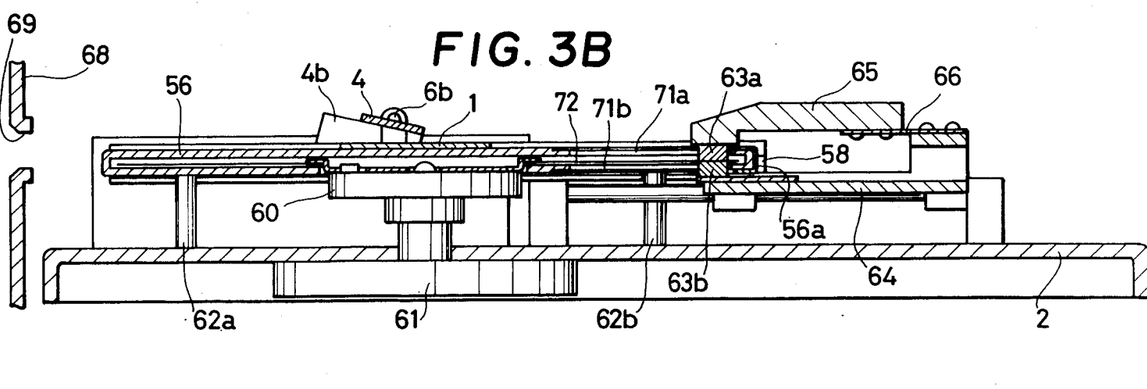
Figure 4:
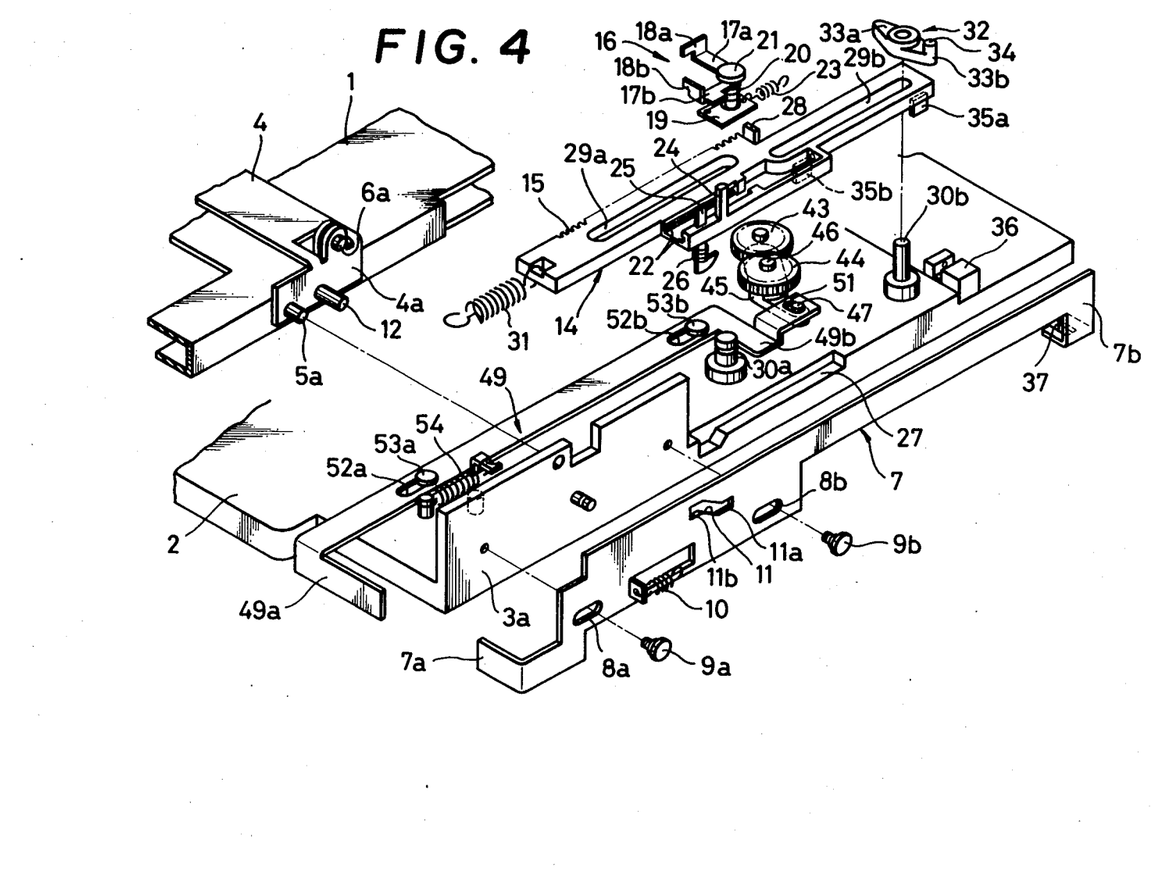
FIG. 4 is an exploded, perspective view of essential parts of the loading device.

As illustrated in FIGS. 3A and 3B, a turntable 60 is arranged horizontally at the center of the cassette loading position, and this turntable 60 is driven by a motor 61 fixed to the chassis 2. Arranged on both sides in front of and at the rear of the turntable 60 are four positioning pins 62a and 62b which are also fixed to the chassis 2.

A pair of upper and lower recording and reproducing heads 63a and 63b are provided at the rear of the turntable 60, and the lower head 63b is secured to a movable stand 64 which is so mounted on the chassis 2 as to be movable to and fro (in the directions of arrows c and c'). Further, a support member 65 is mounted on the movable stand 64 through a leaf spring 66 so as to be swingable in the up and down directions (in the directions of arrows d and d'), and the upper head 63a is secured to the lower face of the free end of the support member 65.

Plate 7 will be described with reference to FIGS. 4 and 5A to 5D. Plate 7 is described hereinafter on referring to FIGS. 4 to 5D:

A sliding member 14 is arranged on the chassis 2 along the longitudinal axis of the loading device, and this sliding member 14 comprises a front portion, a central portion and a rear portion. A rack 15 is formed on a side of the front portion which is positioned near the center of the chassis 2 with regard to its longitudinal axis, and a coupling device 16 is mounted on the central portion of the sliding member 14.

This coupling device 16 comprises an L-shaped piece including a pair of arms 17a and 17b, at the respective free ends of which bent ends 18a and 18b are formed upright. A base plate 19 is guided by a guideway 22 which is disposed on the central portion of the sliding member 14 and a flanged head pin 21 pivotally connects the L-shaped piece to the base plate 19. A coil spring 20 surrounds the pin 21 and urges the L-shaped piece toward the flanged head of the pin 21 and swingably in the direction of arrow e shown in FIG. 5A.

Figure 5A:
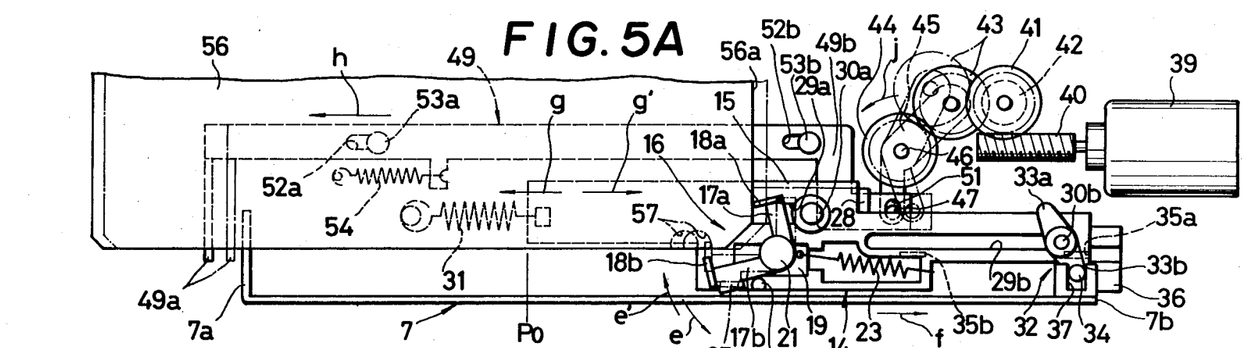
FIGS. 5A to 5D are fragmentary enlarged plan views of the essential parts of the loading device for explaining functions thereof.
Figure 5B:
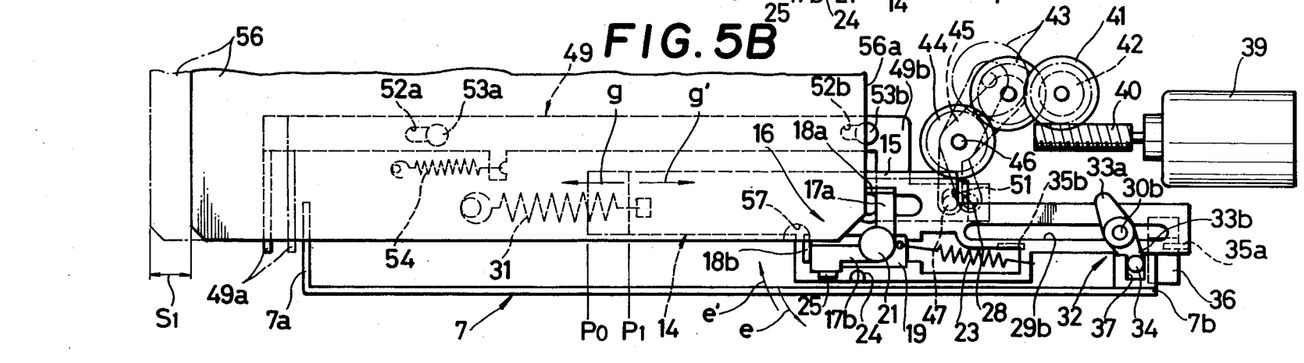

The coupling device 16 is urged along a guideway 22 by a spring 23 in the direction of arrow f on FIG. 5A. A fixed stopper 24 restricts the swing of the engagement member 16 the direction of arrow e, and a movable stopper 25 restricts the return swinging of the coupling device 16 in the direction of arrow e after coupling device has been swung in the direction of arrow e' against the force of the coiled spring 20 as shown in FIG. 5B. The movable stopper 25 is urged downward by a spring 26, and is guided for vertical movement in the upward direction by a guideway 27 provided on the chassis 2 (FIGS. 2A and 2B).

An upstanding portion 28 disposed on the sliding member 14 protrudes from the rear of the front portion of the sliding member 14 which is guided by the engagement, in a pair of elongated holes 29a, 29b, in the front portion and the rear portion of the sliding member 14, of a pair of pins 30a and 30b which are disposed on the chassis 2 and fitted loosely in the respective elongated holes 29a, 29b.

Further, the sliding member 14 is urged by a spring 31 in the forward direction indicated by arrow g on FIG. 5A), and a rotary member 32 is mounted rotatably the pin 30b. This rotary member 32 has a pair of arms 33a and 33b, and a pin 34 directed upwardly from the arm 33b.

Depending from the rear lower face of the sliding member 14 are a pair of detected pieces 35a and 35b. These detected pieces 35a, 35b are detected by a sensor 36, such as a photo-coupler, when the sliding member 14 is moved slidingly. The sensor 36 is fixed to the chassis 2.

The operating plate 7 is bent at its forward end, as at 7a, to approach the front of the chassis 2, and further, an engagement groove 37, in which the pin 34 of the rotary member 32 is loosely fitted, is provided at the rear end of the operating plate 7.

At the rear portion of the chassis, there are mounted a motor 39 which is rotatable in both regular or forward and reverse directions. A worm 40 fixed to the shaft of this motor 39 is engaged with a worm wheel 41, a gear 42 integrally formed with and located under this worm wheel 41 is engaged with an intermediate gear 43, and this intermediate gear 43 is engaged with a drive gear 44.

The intermediate gear 43 and drive gear 44 are supported on an arm 45 which has a sharply curved part, and is so mounted on the chassis 2 as to turn on a pivot 46. That is, the arm 45 has a pin 47 at one end, the intermediate gear 43 is rotatably arrnaged at the other end of this arm 45, and the drive gear 44 is so arranged as to rotate on the pivot 46. Thus, these gears, i.e. gear 42, intermediate gear 43 and drive gear 44 constitute a transmission mechanism, and a gear clutch is made by means of rotating the arm 45 and breaking an engagement between the gear 42 and the intermediate gear 43.

An ejection operating member 45 is arranged along the sliding member 14 and a little near the center of the chassis 2 as compared with this sliding member 14. The fore end 49a of this ejection operating member 49 is so bent as to be occupied in front of the fore end 7a of the operating plate 7, and an elongated hole 51 is provided at the rear of the ejection operating member 49 so as to fit the pin 47 of the arm 45 loosely therein.

The ejection operating member 45 is guided by a combination of a pair of elongated holes 52a and 52b which are disposed in the ejection operating member 49, and a pair of guide pins 53a and 53b disposed on the chassis 2, so that the ejection operating member 45 can be moved slidably in the longitudinal direction of the chassis 2. In addition, the ejection operating member 49 is urged by a spring 54 in the fore direction (in direction of arrow h as shown in FIG. 5A).

Figure 1:
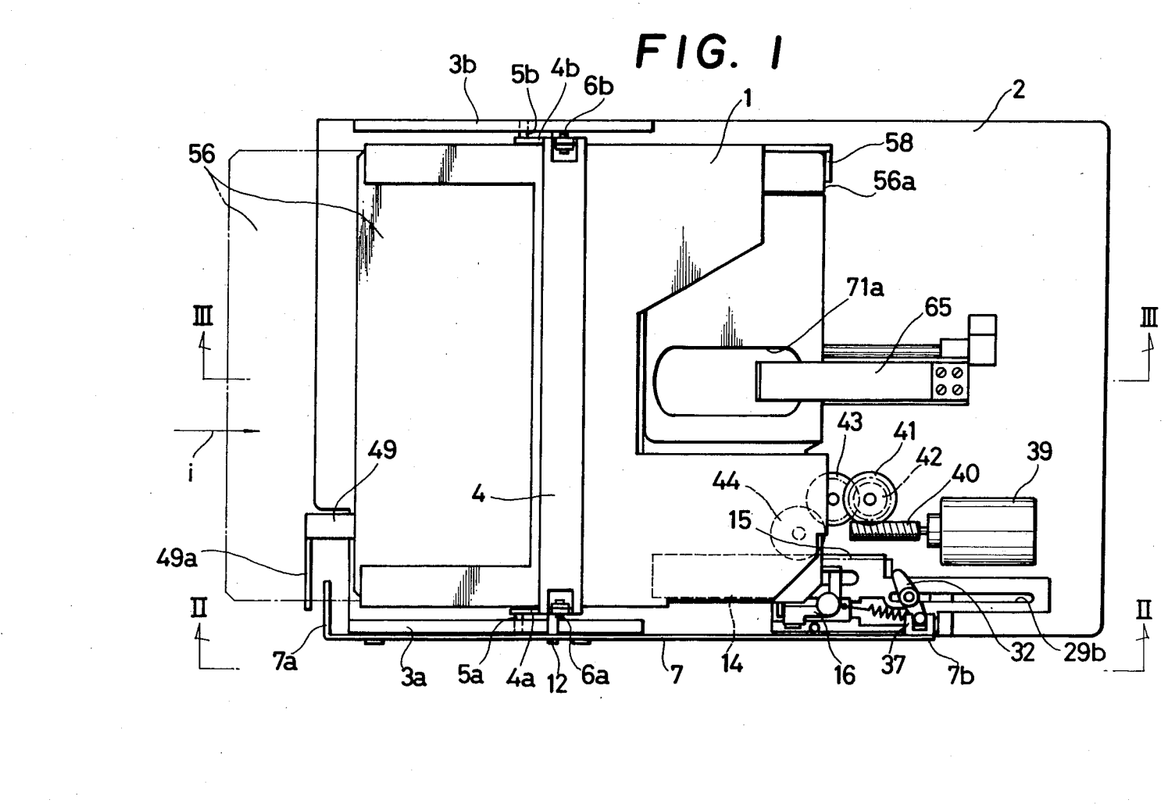
FIG. 1 is a plan view of a loading device for micro floppy disc cassettes according to an embodiment of this invention.

Now, the function of the loading device for the micro floppy disc cassettes so constituted as mentioned above is described hereinafter:

As indicated in dot-and-dash lines in FIGS. 1 and 2A, a disc cassette 56 is inserted horizontally in the cassette holder 1 in direction of arrow i through an insertion slot 69 disposed in the front panel 68 of the loading device.

As the disc cassette 56 is manually inserted, the edge 56a of the disc cassette 56 is pressed against the bent end 18a of the arm 17a of the coupling device 16 positioned as indicated in solid lines in FIG. 5A. Thereby, the coupling device 16 is angularly displaced in direction of arrow e' against the force of the spring 20 as indicated in dot-and-dash lines.

When the disc cassette 56 is pushed further into holder 1, the bent end 18b of the arm 17b of the coupling device 16 is engaged with an engaging portion or recess 57 provided in the lower face near the side of the disc cassette 56, and then the sliding member 14 which is thereby coupled or made integral with the disc cassette 56 is slid in the direction of arrow g' against the force of spring 31.

When the detected piece 35a is detected by the sensor 36, the motor 39 is driven in the regular direction, and thereby, the drive gear 44 is rotated in direction of arrow j through the transmission mechanism.

In the meantime, as soon as the sliding member 14 begins to slide with the disc cassette 56, movable stopper 25 is guided by the guideway 27 of the chassis 2 and moved upward against the force of the spring 26 from a position indicated in dot-and-dash lines to a position indicated in solid lines in FIG. 2A, and thereby, the coupling device 16 is restrained from rotating in the direction of arrow e from its position shown on FIG. 5B, so that the engagement between the disc cassette 56 and coupling device 16 is surely maintained.

When the sliding member 14 is further slidably displaced due to manual pushing of the disc cassettte 56 and reaches a position shown in FIG. 5B, the rack 15 of the sliding member 14 is engaged with the drive gear 44 and thereby, the disc cassette 56 begins to be moved automatically, that is, by operation of motor 39.

All of the above operations occur during the manual pushing of the disc cassette 56 through a very small distance $S_1$ of about 5 mm, in case of the embodiment mentioned above, and in the course of which the sliding member 14 is slidably from an initial position $P_0$ to a first position $P_1$ as shown in FIGS. 5A and 5B.

Figure 5C:
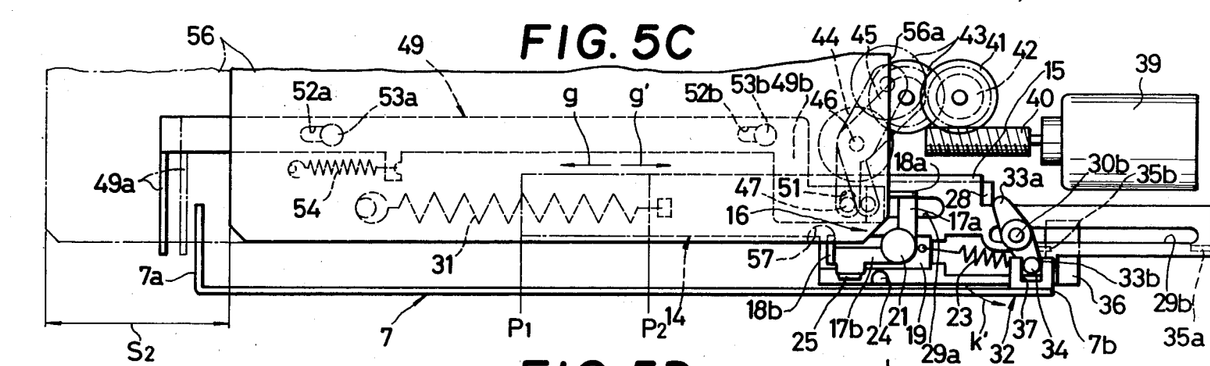

As the sliding member 14 is displaced in the direction of arrow g' against the force of spring 31 by the operation of motor 39, the disc cassette 56 is drawn further into the cassette holder 1 and as soon as the disc cassette 56 abuts against a stopper 58 formed integrally with and situated at the rear end of the cassette holder 1 (FIG. 1), further movement of the disc cassette 56 in the cassette holder 1 is arrested, as shown in FIGS. 1, 3A and 5C. And at this time, the upstanding portion 28 of the sliding member 14 is in contact with the arm 33a of the rotary member 32 as shown in FIG. 5C.

The above operation is performed while the disc cassette 56 is moved a distance $S_2$, that is, the sliding member 14 moves from the position where the rack 15 begins to engage with the drive gear 40, to a second position $P_2$ where the disc cassette 56 is completely drawn into the cassette holder 1, and in case of the above embodiment, the length $S_2$ is about 17 mm.

Figure 5D:
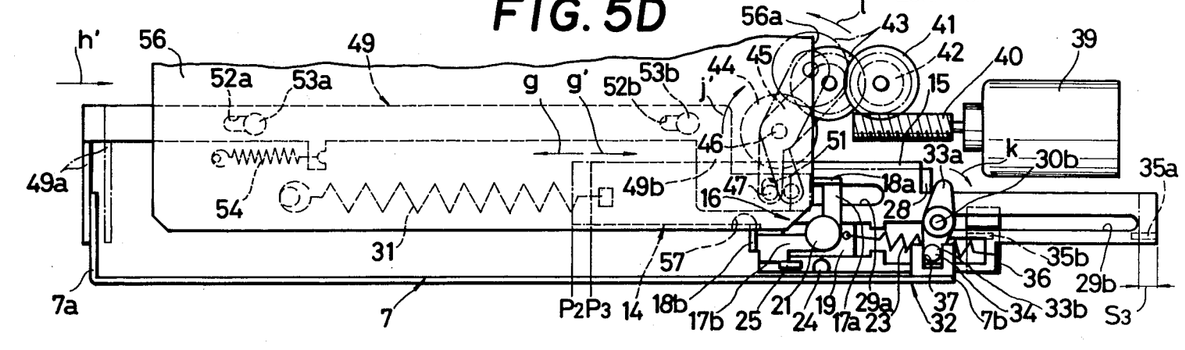

While the sliding member 14 is further displaced by the operation of motor 39, coupling device 16 is kept in the position shown in FIG. 5C, because the disc cassette 56 engages stopper 58 can not be further moved. Therefore spring 23 is stretched. At the same time, the arm 33a of the rotary member 32 is pushed by the upstanding portion 28 of the sliding member 14 as shown in FIG. 5D, and the rotary member 32 is angularly displaced in the direction of arrow K. Then, the operating member 7 is pushed by the pin 34 of the rotary member 32, and slid in direction of arrow a' against the force of spring 10. Thereby, the cassette holder 1 is lowered from the cassette inserting position to the cassette loading position.

At this time, the L-shaped piece of the coupling device 16 is moved downward by the cassette 56 against the force of the spring 20, so that the engagement between the disc cassette 56 and the L-shaped piece is maintained, and the motor 39 is stopped, in response to the detection of detected piece 35 by sensor 36.

The above operation is performed while the disc cassette 56 moves the distance $S_3$, that is, the sliding member 14 moves from the second position $P_2$ to the last position $P_3$ as shown in FIG. 5D, and in case of the described embodiment, the distance $S_3$ is about 3 mm.

As described above, the cassette holder 1 is lowered from the cassette inserting position to the cassette loading position, so that the disc cassette 56 is also lowered in parallel motion from the position above the turntable 60 as shown in FIG. 3A, to the position on the turntable 60 as shown in FIG. 3B so as to be loaded on the turntable 60 and simultaneously mounted on the positioning pins 62a, 62b.

Further, when the disc cassette 56 is loaded as described above, the lower head 63b is inserted in the opening 71b of the disc cassette 56 as shown in FIG. 3B, and comes in touch with the lower face of the magnetic disc 72. And the support member 65 is rotated in direction of arrow d' as the cassette holder 1 is lowered, so that the upper head 63a is also inserted in the opening 71a of the disc cassette 56 and comes in touch with the upper face of the magnetic disc 72. Thereby, the loading operation of the disc cassette 56 is finished.

Now, the ejecting operation of the disc cassette 56 will be described. With the loading device in the state illustrated in FIG. 5D, when the motor 39 is rotated in the reverse direction in response to a suitable command signal for ejecting: the disc cassette 56, the drive gear 44 is rotated in the direction of arrow j' and the sliding member 14 is slidably displaced in the direction of arrow g.

At this time, the initial displacement of the sliding member 14 is absorbed by the contraction of spring 23, so that coupling device 16 is not moved, and therefore, the disc cassette 56 engaged therewith is also kept abutting against the stopper 58 of the cassette holder as shown in FIG. 5D.

The rotary member 32 is turned in the direction of arrow k' on FIG. 5C due to the above movement of the sliding member 14, so that the operating plate 7 is free to be slid in direction of arrow a (FIG. 2A) through the force of spring 10. As shown in FIG. 2A, the connecting plate 4 is pivoted in the direction of arrow b on the first pivots 5a and 5b, and the cassette holder 1 is thereby raised to the cassette inserting position.

Due to the further reverse operation of the motor 39, the sliding member 14 is slid in direction of arrow g as shown in FIGS. 5C and 5B, and the disc cassette 56 is pushed through the coupling device 16 and ejected.

Even after the rack 15 of the sliding member 14 is disengaged from the drive gear 44, the sliding member 14 is slid further in the direction of arrow g by the force of the spring 31. Accordingly, the movable stopper 25 guided by the guideway 27 of the chassis 2 is moved downward, by spring 26 and the L-shaped piece of the coupling device 16 is rotated in the direction of arrow e by the force of the coiled spring 20.

Then, the bent end 18b of the arm 17b of coupling device 16 is disengaged from the engaging portion or recess 57 of the disc cassette 56 and simultaneously, the bent end 18a of the arm 17a pushes forward the disc cassette 56 so as to have the disc cassette 56 ejected from holder 1, as shown in FIG. 5A.

Thus, the disc cassette 56 is both loaded and ejected automatically through the power of the motor 39. The disc cassette 56 is never inclined in the cassette holder 1 when inserted, because it is drawn-in very stably. Hence, it is possible to prevent the disc cassette 56 from colliding with the upper head 63a. Further, as the cassette holder 1 can be lowered quietly with a constant speed, the upper and lower heads 63a and 63b do not come in contact inpulsively with the magnetic disc 72 thereby avoiding damage to the heads at the time when the disc cassette 56 is lowered.

Further, spring 23 which connects coupling device 16 with the sliding member 14 functions to accurately position the disc cassette in the cassette holder 1 when the cassettte holder 1 is raised or lowered. That is, the sliding member 14 stretches spring 23, while it is slid from the second position $P_2$ where the disc cassette 56 is to be completely drawn-in, to the last positon $P_3$, so that the disc cassette 56 is pressed surely by the force of spring 23 against the stopper 58 of the cassette holder 1, and it becomes possible to set the disc cassette 56 accurately on the turntable 60.

Further, when the disc cassette 56 is pushed just a bit by hand after the disc cassette 56 is inserted through the insertion slot 69 of the front panel 68, the disc cassette 56 is loaded automatically by the motor 39. Similarly, the disc cassette 56 is ejected automatically by the motor 39. Accordingly, it is not necessary to have the insertion slot 69 opened widely so as to make it possible to hold easily the disc cassette 56 between fingers and thumb. The small insertion slot is to improve the appearance of the front panel of the loading device.

Furthermore, as the disc cassette 56 is ejected automatically by the motor 39, it becomes possible to eject it automatically through computor-controlled signals.

Next, the ejecting operation of the disc cassette 56 at the time of an electricity failure or emergency will be described. With the disc cassette 56 initially in the cassette loading position as shown in FIG. 5D, if the front end 49a of the ejection operating member 49 is pushed as indicated in dot-and-dash lines and the ejection operating member 49 is thereby slidably displaced in the direction of arrow h' against the force of the spring 54, the pin 47 on the arm 45 is pressed by an edge of the elongated hole 51 disposed at the rear end 49b of the ejection operating member 49, and the arm 45 is turned about pivot 46 as indicated in the dot-and-dash lines in direction of arrow 1.

Then, the intermediate gear 43 is disengaged from the gear 42, and the drive gear 44 becomes freely rotatable, so that the sliding member 14 is slidably displaced in the direction of arrow g by the force of spring 31.

Thus, the operating plate 7 is slidably displaced in the direction of arrow a by the force of spring 10, and the connecting plate 4 is pivoted counterclockwise about pivots 5a and 5b as shown in FIG. 2A, so that the cassette holder 1 is raised to the cassette inserting position.

In the meanwhile, when the ejection operating member 49 is slid the direction of arrow h', its forward end 49a presses against the forward end 7a of the operating plate 7. Therefore, the operating plate 7 can be surely moved in direction of arrow a not only by the force of spring 10 but also by the force applied to the forward end 49a of the ejection operating member 49.

Finally, the movable stopper 25 is moved downward by spring 26 under the guidance of the guideway 27, so that the L-shaped piece of the coupling device 16 is rotated in the direction of arrow e. As a result of the foregoing, the disc cassette 56 is pushed and ejected by the bent end 18a of the arm 17a, simultaneously with the bent end 18b of the arm 17b being disengaged from the recess 57 of the disc cassette 56.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

For example, it can be possible that the operating plate 7 is constituted differently from that of the illustrative embodiment, which is displaced rearward by the first spring 10. More specifically, the operated plate 7 may be displaced forwardly by the spring 10 and when the sliding member 14 is slid rearward, the operating plate 7 maybe slid rearward against the force of spring 10 not through the rotary member 32 but directly by the sliding member 14. In this case, inclination of the inclined guideway 11 of the operating plate 7 is the reverse of that of the illustrative embodiment.

This invention can be applied to the loading device not only for the micro floppy disc cassettes but also for various other types of disc cassettes, in which recording and/or reproducing discs are accommodated.

In case of this invention, the engaged portion or recess 57 of the disc cassette is engaged with the coupling device 16 when the disc cassette which is inserted in the cassette holder, reaches the first position, and when the disc cassette is inserted further to the second position, the disc cassette is automatically drawn further into the cassette holder through the coupling device 16 by the motor. Therefore, it becomes possible to draw the disc cassette very stably into the cassette holder, so that the disc cassette is prevented completely from being so inclined as to collied with the upper head.

Further, when the disc cassette which is drawn-in in succession, reaches the third or final position relative to the holder, the disc cassette is automatically lowered quietly and acurately with a constant speed. Therefore, the disc cassette is prevented from being lowered rapidly, so that the upper and lower heads, between which the magnetic disc is sandwiched, cannot collide impulsively with each other and be damaged thereby.

What is claimed is:

1. In a disc drive for use with a disc cassette having a record disc rotatable within a cassette housing provided with an engaging portion, and which includes a chassis and a turntable rotatably mounted on said chassis: a loading device for said disc cassette comprising spaced apart upright support plates on said chassis at opposite sides of said turntable; a cassette holder arranged horizontally between said support plates; means movably mounting said cassette holder in respect to said support plates for movement between a raised cassette inserting position in which said cassette housing with said disc therein is slidable in a predetermined horizontal direction into and out of said holder and a lowered loading position in which the record disc within said cassette housing in said holder engages said turntable with said holder remaining substantially horizontal during said movement between said cassette inserting position and said loading position; coupling means engaged with said engaging portion of the cassette housing when the latter reaches a first location in said holder during manual insertion of the cassette in said direction into said holder in said inserting position; detecting means for detecting further insertion of said cassette housing in said direction into said holder to a second location beyond said first location; electrical motor driven means energized in response to said detecting means upon the attainment of said second location by the inserted cassette housing and being operable by way of said coupling means for further drawing said cassette housing in said direction into said holder to a third location beyond said second location; and raising and lowering means for lowering said holder to said loading position in response to further operation of said motor driven means following attainment of said third location by the cassette housing in said holder.

2. The disc drive according to claim 1; further comprising a slide member movable on said chassis parallel to said direction of insertion, a first spring connected with said slide member and urging the latter in the direction opposed to said direction of insertion, means mounting said coupling means on said slide member for limited movement relative to the latter parallel to said direction of insertion, and a second spring connected between said slide member and said coupling means for urging the latter in said direction of insertion to one end of said limited movement relative to the slide member; and in which said motor driven means includes a reversible electric motor fixed on said chassis, a drive gear rotatable at a fixed location on said chassis, transmission means for driving said drive gear from said motor, and a gear rack on said sliding member engageable by said drive gear upon movement of said slide member with said coupling means in correspondence to said attainment of said second location by said inserted cassette housing.

3. The disc drive according to claim 2; further comprising stop means for limiting the insertion movement of said cassette housing into said holder to said third location; and in which said slide member is subjected to further movement by said motor and drive gear engaging said gear rack following attainment of said third location with said second spring resisting said further movement; and said raising and lowering means includes an operating plate mounted for movement parallel with said slide member between first and second positions corresponding to said cassette inserting position and loading position, respectively, a third spring urging said operating plate to said first position, and means responsive to said further movement of said slide member for displacing said operating plate to said second position against the force of said third spring and with said coupling means continuing its engagement in said engaging portion of the cassette housing.

4. The disc drive according to claim 3; further comprising manually operable ejection control means for disengaging said transmission means in respect to said motor, whereupon said holder is free to be raised to said inserting position from said loading position by said raising and lowering means under the urging of said third spring and said slide member is movable by said first spring for causing said coupling means to eject the cassette housing from said holder in said raised inserting position.

* * * * *